Sept. 12, 1933.    C. C. CAMPBELL    1,926,834
METHOD OF MAKING LUBRICATING MEANS FOR LEAF SPRINGS
Filed April 24, 1930
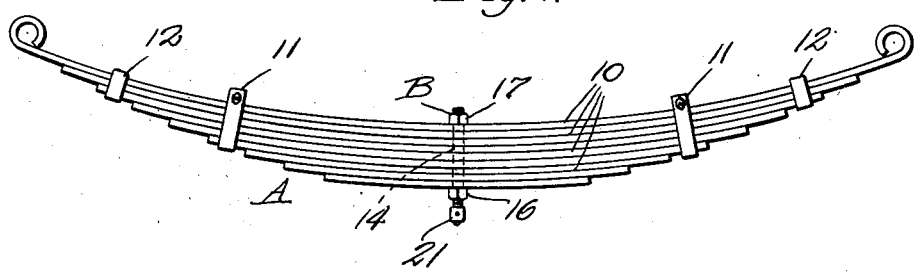
Fig. 1.
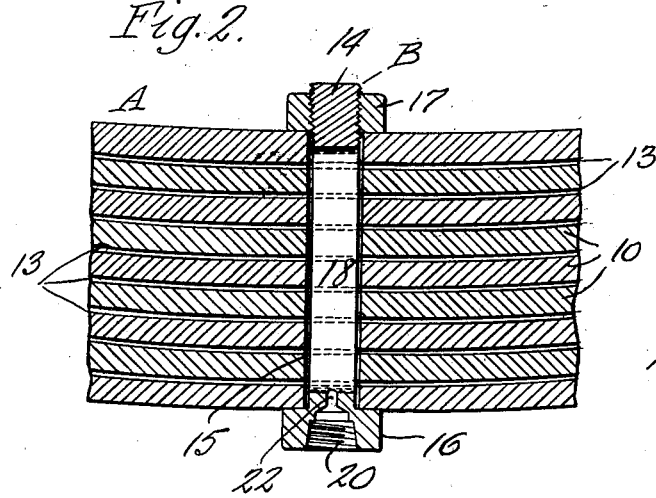
Fig. 2.
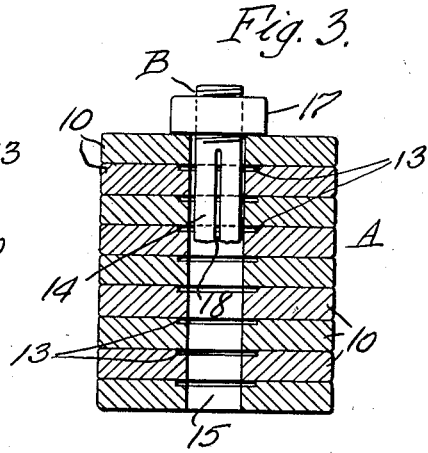
Fig. 3.
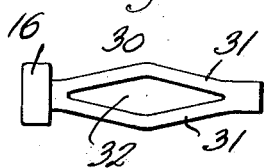
Fig. 6.
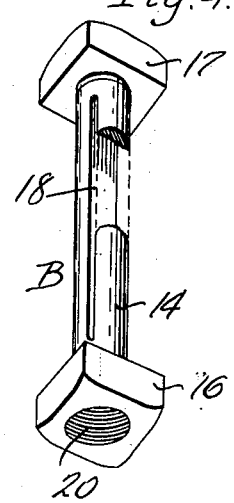
Fig. 4.
Fig. 7.
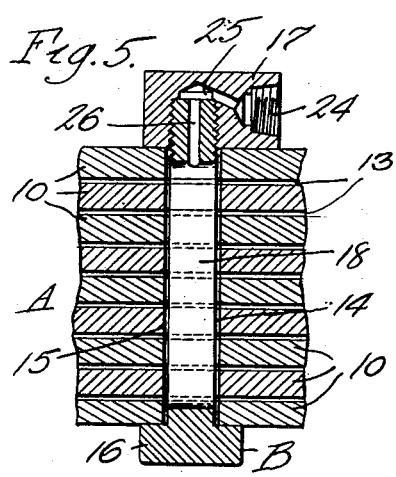
Fig. 5.
INVENTOR.
Charles C. Campbell
by Parker & Prichnow
ATTORNEYS.

Patented Sept. 12, 1933

1,926,834

UNITED STATES PATENT OFFICE 1,926,834

METHOD OF MAKING LUBRICATING MEANS FOR LEAF SPRINGS

Charles C. Campbell, Lockport, N. Y., assignor to Charles C. Campbell, Jr., Lockport, N. Y.

Application April 24, 1930. Serial No. 446,896

1 Claim. (Cl. 29—148)

This invention relates to improvements in lubricating means or devices for leaf springs.

One type of lubricating device provided for this purpose is in the nature of a bolt disposed in a hole extending through the leaves of the spring. Such devices are provided with external or internal grooves or passages, connected by transverse drilled holes or orifices, or is otherwise provided with passages for conducting the lubricant. However, in these prior constructions the various grooves or passages and holes are of relatively small cross sectional area, and readily become clogged. In some cases the provision of these orifices and passages weakens the bolt to such an extent that the device becomes broken and inoperative in use.

Furthermore, the formation of the passages, especially the interior and transverse holes, can only be produced by drilling, or other separate machine operations performed after the bolt is made, thus making the cost of these devices relatively expensive, especially when a number of such holes are to be formed in a single device.

The objects of the present invention are to construct a lubricating device for leaf springs of the character described which is of relatively simple and inexpensive construction, and is rugged and durable in use; also to provide a lubricating device or bolt for leaf springs which is so constructed that it will readily conduct the lubricant where required, and will not become clogged in use; also to construct a device of this kind in which a minimum amount of machine or other operations are required in its production; also to construct a leaf spring lubricating device which can be substituted for the usual center bolt of springs already in use without necessitating any change in the springs; and also improve lubricating devices for leaf springs in the other respects hereinafter set forth and claimed.

In the drawing:

Fig. 1 is a side elevation of a leaf spring provided with the novel lubricating device embodying the invention;

Fig. 2 is a fragmentary longitudinal section of a leaf spring provided with a lubricating bolt or device constructed in accordance with one embodiment of the invention;

Fig. 3 is a transverse section thereof showing the lubricating device partly broken away;

Fig. 4 is a perspective view of the lubricating device shown in Figs. 2 and 3, detached from the spring, and with a part thereof broken away;

Fig. 5 is a longitudinal section of a spring provided with a lubricating bolt or device of slightly modified construction;

Fig. 6 is a side view of a blank showing an intermediate form of the bolt or device during its manufacture; and Fig. 7 is a similar view showing another step in the manufacture of the bolt or device.

For the purpose of illustration, the lubricating bolt or device of this invention is shown in connection with a semi-elliptical spring A of ordinary construction composed of a series of superposed leaves or laminations 10 connected by clips or shackles 11 and 12. Extending transversely through the superposed leaves 10 of the spring A, and preferably centrally of the spring, is the lubricating device B which, in accordance with usual practice, is in the form of a bolt and is intended to initially hold the leaves together and which is modified so as to be utilized for the additional purpose of lubricating the contacting surfaces between the spring leaves 10. The spring leaves may, if desired, be provided with slots or grooves 13 extending lengthwise of the leaves, for carrying lubricant from the bolt to the contacting surfaces of adjacent spring leaves.

In the construction shown in Figs. 1 to 4, the bolt comprises a substantially cylindrical shank 14 which extends through and is received in a central hole or passage 15 formed by a series of alined separate holes or apertures in each of the superposed leaves 10 of the spring. The bolt is provided, at one end as usual, with a head or enlargement 16, and the shank 14 is threaded at its opposite end for the reception of a nut or securing member 17, which by engagement with one face of the spring A, draws the head 16 tightly against the opposed face thereof, thus holding the bolt in place and clamping the leaves together.

As shown in Figs. 2 and 4, the shank of the bolt is formed with a narrow longitudinal slot 18 which extends transversely therethrough from one side to the other, so as to form a continuous passage reaching, in the form shown, approximately from one outer leaf of the spring to the other.

In arranging the bolt or device B in the spring, said slot 18 is preferably disposed so as to extend longitudinally of the spring, as shown in Fig. 2, so that lubricant in said slot 18 can pass therefrom lengthwise of the leaves more readily than in the transverse direction of said leaves, but it is not essential that the slot be so disposed.

Any suitable means may be provided for supplying lubricant to the slot or passage 18 of the device B. For example, in Figs. 1 to 4, the head 16 of the bolt is provided with a threaded opening or aperture 20 for the reception of any suitable lubricating fitting or attachment 21, Fig. 1, and the aperture 20 is placed into communication with the slot 18 by means of a short central hole or passage 22 which can be drilled or otherwise formed in the device.

In the modification shown in Fig. 5, the nut 17 of the bolt or device B is provided with a lateral threaded opening 24 terminating in a reduced inner passage 25 which communicates with a central hole or passage 26 extending through the threated end of the bolt or device to the slot 18.

It will be readily seen that by the construction described, a relatively large amount of lubricant can be introduced and contained in the slot 18, since the latter extends entirely through the shank of the bolt or device B, and owing to the relatively large area of the slot 18, any small particles of foreign matter introduced thereinto with the lubricant or otherwise will not plug up the device or prevent the effectual lubrication of the surfaces between the leaves.

In the illustrated arrangement the slot 18 uniformly supplies lubricant to all of the abutting spring faces, since it extends opposite all of such faces. However the slot may be otherwise arranged and the same placed in communication with the lubricating means in other ways than by the provision of the interior small passage or passages, if desired.

The slot 18 may be formed in the bolt or device B in any suitable manner, but preferably it is formed during the process of manufacture of the bolt, for example the latter can be stamped or forged as a blank 30, see Fig. 6, in which the shank of the blank is initially formed with two bowed, spaced intermediate parts 31, thus providing a relatively large opening 32 substantially in the form of a parallelogram. To convert this opening 32 into the relatively narrow straight slot 18 required, a shim or thin, flat plate 34 having opposite parallel faces is inserted into the opening 32, and the blank 30 is then subjected to pressure in such direction that the opposite bowed sides 31 thereof will be straightened out and the inner faces thereof brought into contact with the opposed parallel faces of the shim 34. The latter is then removed, leaving a narrow straight slot 18, and cylindrical shank 14 which shank can then be threaded for the reception of the nut 17.

In thus forming the bolt or device B no milling or other machine operations are required to produce or form the relatively narrow straight slot 18. The cost of production of the device is, therefore, greatly reduced, since the only machining operations required are those of drilling the short communicating passages between the lubricating means and the slot 18, and tapping the aperture for the reception of said lubricating means.

I claim:

A method of forming a lubricating device for leaf springs of the type having a plurality of superposed leaves with aligned holes extending transversely through said leaves, which comprises forging a bolt blank with spaced bowed intermediate sections to provide a relatively large elongated aperture in the shank of the bolt, inserting a plate into said aperture, forging the shank to shape it and compress said sections tightly against said plate, removing said plate to leave a slot in said shank, and drilling a hole from one end of said bolt to said slot.

CHARLES C. CAMPBELL.